US009076180B2

(12) United States Patent
Scott

(10) Patent No.: US 9,076,180 B2
(45) Date of Patent: \*Jul. 7, 2015

(54) CUSTOMIZED PRODUCT DISPLAY

(71) Applicant: Amazon Technologies, Inc., Seattle, WA (US)

(72) Inventor: Sean M. Scott, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,668

(22) Filed: Mar. 10, 2014

(65) Prior Publication Data

US 2014/0195388 A1  Jul. 10, 2014

Related U.S. Application Data

(63) Continuation of application No. 12/634,287, filed on Dec. 9, 2009, now Pat. No. 8,700,492.

(51) Int. Cl.
*G06Q 30/00* (2012.01)
*G06Q 30/06* (2012.01)

(52) U.S. Cl.
CPC ........ *G06Q 30/0643* (2013.01); *G06Q 30/0621* (2013.01)

(58) Field of Classification Search
CPC ... G06F 8/60; G06F 3/0481; G06K 2017/009; H04L 29/06027; H04L 51/34; H04L 51/38; G06Q 30/00; G06Q 30/0643
USPC .................................... 705/26.1, 27.1
See application file for complete search history.

(56) References Cited

U.S. PATENT DOCUMENTS

| 8,001,015 B2 | 8/2011 | Perrier et al. |
| 2007/0198924 A1 | 8/2007 | Koike et al. |
| 2007/0255631 A1 | 11/2007 | Schmidt et al. |
| 2009/0164323 A1 | 6/2009 | Byrne |
| 2011/0082824 A1 | 4/2011 | Allison et al. |
| 2011/0126247 A1 | 5/2011 | Howarter et al. |

OTHER PUBLICATIONS

"SolidWorks and SAQQARA Team to Provide 3D Online Catalogs", Jul. 30, 2013, published by Business Wire 2013 [online][retrieved on Dec. 5, 2013] retrieved from: http://search.proquest.com/printviewfile?accountid+14753 , 2 pps.
U.S. Official Action dated Jan. 23, 2012 in U.S. Appl. No. 12/634,287, filed Dec. 9, 2009, First Named Inventor: Sean M. Scott.

(Continued)

*Primary Examiner* — Brandy A Zukanovich
(74) *Attorney, Agent, or Firm* — Lee & Hayes, PLLC

(57) ABSTRACT

Technologies are described herein for customized product display. A data structure schema is defined for describing product graphics, such as product images, and for defining how aspects of the product graphics should be displayed. Through the use of the schema, a product manufacturer can provide product graphics to an e-commerce merchant along with product display data formatted according to the schema that provides instructions to the merchant regarding how the manufacturer prefers the product graphics to be displayed. The merchant can then utilize the product graphics and the product display data to generate a product page for the product.

18 Claims, 5 Drawing Sheets

(56) References Cited

OTHER PUBLICATIONS

U.S. Official Action dated Jun. 26, 2012 in U.S. Appl. No. 12/634,287, filed Dec. 9, 2009, First Named Inventor: Sean M. Scott.
U.S. Official Action dated Jan. 31, 2013 in U.S. Appl. No. 12/634,287, filed Dec. 9, 2009, First Named Inventor: Sean M. Scott.
U.S. Official Action dated Oct. 3, 2013 in U.S. Appl. No. 12/634,287, filed Dec. 9, 2009, First Named Inventor: Sean M. Scott.
U.S. Notice of Allowance/Allowability dated Dec. 12, 2013 in U.S. Appl. No. 12/634,287, filed Dec. 9, 2009, First Named Inventor: Sean M. Scott.

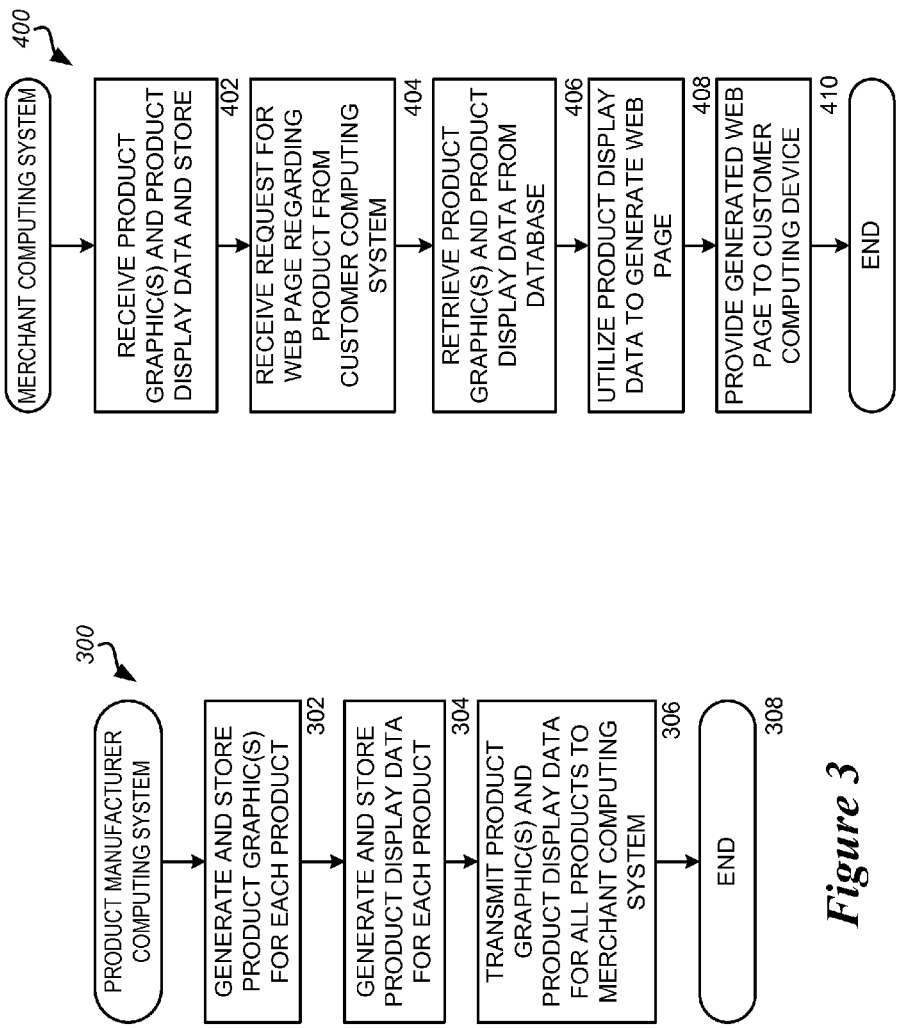

CUSTOMIZED PRODUCT DISPLAY

CROSS REFERENCE TO RELATED APPLICATIONS

This application is a continuation of co-pending U.S. application Ser. No. 12/634,287, entitled "CUSTOMIZED PRODUCT DISPLAY" filed Dec. 9, 2009, and which is expressly incorporated herein by reference in its entirety.

BACKGROUND

Product manufacturers often spend many man-hours and thousands of dollars designing the packaging for a product. Manufacturers typically expend these resources in an attempt to create product packaging that is highly attractive to consumers when the product is placed on a shelf in a retail outlet. Manufacturers often give little thought, however, to how a product will be presented on Internet-based e-commerce World Wide Web ("Web") sites. As a result, the task of generating product images for use on e-commerce Web sites is typically left up to the e-commerce merchant.

In order to generate product images for use on an e-commerce Web site, Web-based merchants often generate their own digital photographs of products. For instance, a Web-based merchant may take photographs of a boxed product. The merchant might also un-box the product and take digital photographs of the unboxed product. The digital photographs may then be utilized to create an e-commerce Web page for the product. The process of generating photographs of products for use on an e-commerce Web site can be very expensive for a merchant.

Product photographs taken by a merchant might not emphasize various aspects of a product that the product manufacturer believes to be important. In fact, in certain cases, the images taken and utilized by a merchant to create an e-commerce Web page for a product may be only of the product and not the product packaging. This can be frustrating for a product manufacturer that expends significant resources on designing product packaging.

It is with respect to these and other considerations that the disclosure made herein is presented.

BRIEF DESCRIPTION OF THE DRAWINGS

FIGS. 3 and 4 are flow diagrams showing several illustrative routines showing the operation of a product manufacturer computing system and a merchant computing system, respectively, according to embodiments presented herein;

DETAILED DESCRIPTION

The following detailed description is directed to technologies for customized product display. According to embodiments, a data structure schema is defined for describing product graphics, such as product images, and for defining how aspects of the product graphics should be displayed. Through the use of the schema, a product manufacturer can provide product graphics to an e-commerce merchant along with product display data formatted according to the schema that provides instructions to the merchant regarding how the manufacturer prefers the product graphics to be displayed. The merchant can then utilize the product graphics and the product display data to generate a product page for the product. In this way, the e-commerce merchant is freed from the expensive process of generating product images. Moreover, the product manufacturer is empowered to provide product graphics and product display data that can be utilized by the merchant to display the product graphics in the manner desired by the manufacturer.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
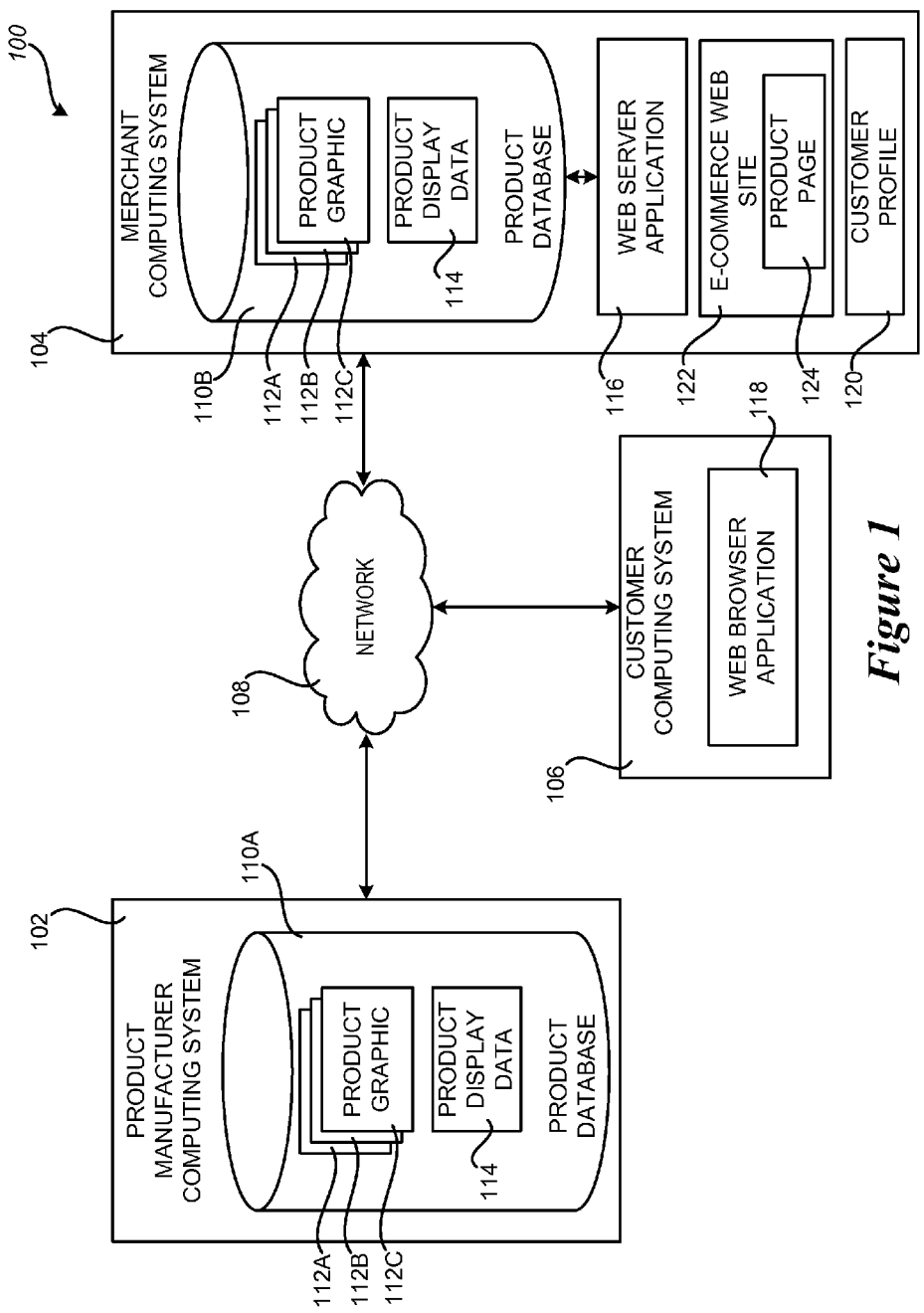
FIG. 1 is a system and network diagram showing aspects of an illustrative operating environment for customized product display, including several software and hardware components provided by embodiments presented herein.

FIG. 1 and the following description are intended to provide a brief, general description of a suitable computing environment in which the embodiments described herein may be implemented. In particular, FIG. 1 is a system and network diagram that shows an illustrative operating environment 100 including several software components for customized product display, according to embodiments provided herein. The environment 100 includes a product manufacturer computing system 102, a merchant computing system 104, and a customer computing system 106. Each of these computing systems will be described in detail below.

The merchant computing system 104 comprises one or more server computers configured to provide an e-commerce Web site 122. In this regard, the merchant computing system 104 is configured to execute a Web server application 116. The Web server application 116 may be one of any number of Web server application programs known in the art running on one or more server computers.

The merchant computing system 104 is also configured in one embodiment to maintain a product database 110B. The product database 110B contains information regarding products made available through the e-commerce Web site 122 provided by the merchant computing system 104. According to one implementation, the product database 110B includes one or more product graphics 112A-112C for each product. As used herein, the term "product graphic" is meant to encompass any type of electronically stored audio-visual content that contains data regarding a product and that can be presented via an e-commerce Web site 122. For instance, a product graphic may include, but is not limited to, video content, an electronic image, audio content, or a rendering of a product. A product graphic may also include an application program configured to provide information regarding a product. For instance, in one implementation, a product graphic comprises a FLASH application created utilizing the FLASH programming and runtime execution environment provided by ADOBE SYSTEMS. A product graphic might also be implemented using the SILVERLIGHT runtime execution environment from MICROSOFT CORPORATION or utilizing other runtime environments.

According to the various embodiments presented herein, a product manufacturer provides the product graphics 112A-112C for a particular product to the merchant computing system 104. As utilized herein, the term "manufacturer" is meant to encompass not only the actual manufacturer of a product but also any agent of a product manufacturer, such as a distributor, wholesaler, reseller, and the like. The term manufacturer also encompasses entities that contract for the manufacture of one or more products and then distribute the products to a retailer or other type of distribution channel. The term "manufacturer" as utilized herein, therefore, generally refers to any entity that provides a product to a merchant for resale.

According to various embodiments, the manufacturer also provides product display data 114 corresponding to the provided product graphics 112A-112C to the merchant computing system 104. The product display data 114 defines how aspects of the product graphics 112A-112C should be displayed on a product page 124 for the product accessible via the e-commerce Web site 122 provided by the merchant computing system 104. Additional details regarding the contents and use of the product display data 114 will be provided below with respect to FIGS. 2-5.

The illustrative operating environment 100 shown in FIG. 1 also includes a customer computing system 106. The customer computing system 106 may be a personal computer, a desktop workstation, a laptop, a notebook, a wireless telephone, a personal digital assistant, a game console, a set top box, a consumer electronics device, a server computer, and the like. A Web browser application 118 may execute on the customer computing system 106 that accesses the Web server application 116 executing on the merchant computing system 104 to retrieve Web pages such as the product page 124 and other content and displays them to a user of the customer computing system 106. The Web browser application 118 may be the INTERNET EXPLORER Web browser from MICROSOFT CORPORATION, or the FIREFOX Web browser from MOZILLA CORPORATION. Other Web browsers might also be utilized.

While the operating environment 100 illustrated in FIG. 1 includes a Web browser application 118 communicating with a Web server application 116, it will be appreciated that other types of client application programs executing on the customer computing system 106 may be utilized to access and retrieve the e-commerce Web site 122 and/or other content from the merchant computing system 104. It is intended that all such client application programs and remote server computers be included in the scope of this application.

The illustrative operating environment 100 illustrated in FIG. 1 also includes a product manufacturer computing system 102. The product manufacturer computing system 102 comprises one or more computer systems operated by or under the direction of a product manufacturer. As shown in FIG. 1, the product manufacturer computing system 102 is configured to maintain a product database 110A. The product database 110A includes one or more product graphics 112A-112C for a product. The product database 110A also includes product display data 114 for the same product. The product graphics 112A-112C stored in the product database 110A are generated by or under the direction of the manufacturer. The product display data 114 is also generated by or under the direction of the manufacturer and corresponds to the product graphics 112A-112C. It should be appreciated that the product display data 114 may be generated by various means including, but not limited to, manual or programmatic mechanisms.

Once the product graphics 112A-112C and the product display data 114 have been generated, the product manufacturer computing system 102 transmits the product graphics 112A-112C and the product display data 114 to the merchant computing system 104. As discussed above, the merchant computing system 104 stores the product graphics 112A-112C and the product display data 114 in the product database 110B. The merchant computing system 104 also utilizes the product graphics 112A-112C and the product display data 114 when responding to a request for a product page 124 for the corresponding product. Additional details regarding the structure and use of the product display data 114 in this regard will be provided below with regard to FIGS. 2-5.

As shown in FIG. 1, the merchant computing system 104 may also store a customer profile 120 for each customer of the e-commerce Web site 122 provided by the merchant computing system 104. The customer profile 120 for a particular customer may be utilized to store data defining a customer's location, preferences, interests, purchasing history, and other demographic, geographic, and psychographic characteristics of the customer. If authorized by the customer, data stored in the customer profile 120 may be utilized in conjunction with the product display data 114 to customize the presentation of a product page 124 for a product to the customer. Additional details regarding this process will be provided below.

As also shown in FIG. 1, a network 108 provides data communications between the product manufacturer computing system 102, the merchant computing system 104, and the customer computing system 106. The network 108 may represent one or more of a local area network, a wide area network, the Internet, or any other networking topology known in the art capable of connecting computer systems described herein. It should be appreciated that the network topology illustrated in FIG. 1 has been simplified and that many more networks might be utilized to provide the appropriate data connections.

Figure 2:
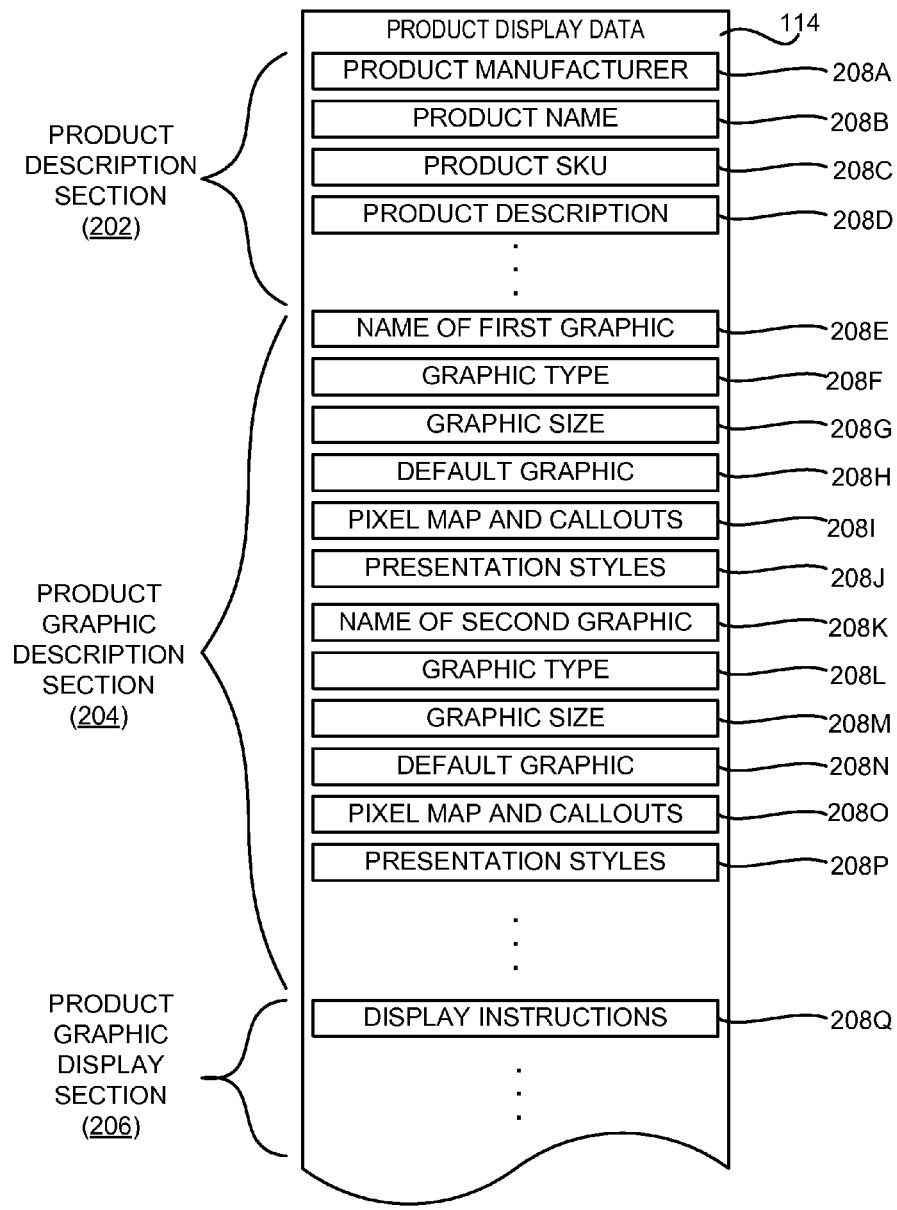
FIG. 2 is a data structure diagram showing aspects of a data structure schema provided in one illustrative embodiment presented herein for storing product display data.

Referring now to FIG. 2, a data structure diagram showing aspects of a data structure schema for storing the product display data 114 will be described. In the illustrative embodiment shown in FIG. 2, the product display data 114 includes a product description section 202, a product graphic description section 204, and a product graphic display section 206. Generally, the product description section 202 provides one or more data fields for storing a textual description regarding a product and its manufacturer. The product graphic description section 204 generally comprises one or more data fields for storing data describing the product graphics 112A-112C along with information regarding how the product graphics 112A-112C should be displayed. The product graphic display section 206 generally provides one or more data fields for storing data that includes further instructions regarding how the product graphics 112A-112C should be displayed. The product description section 202, the product graphic description section 204, and the product graphic display section 206 will be described in greater detail below.

In one embodiment presented herein, the product description section 202 includes data fields 208A-208D. The data field 208A is a text data field configured for storing data identifying the manufacturer of a product. The data field 208B is a text data field configured for storing data identifying a product name. The data field 208C is a text data field configured for storing a product stock keeping unit ("SKU") number or other type of product identifier. The data field 208D is configured for storing a textual product description. As will be described in greater detail below, the merchant computing system 104 may utilize the contents of the data fields 208A-208D to create aspects of a product page 124 corresponding to a product identified by the product display data 114.

According to one implementation, the product graphic description section 204 comprises data for each of the product graphics 112A-112C that defines how each of the product graphics 112A-112C should be displayed on the product page 124. For instance, in one implementation, the product graphic description section 204 includes a data field 208E storing data identifying the name of the first product graphic. A data field 208F stores data identifying the type of graphic of the first product graphic. For instance, the data field 208F may store data indicating whether the first product graphic is an application, a static image, a video, or another type of product graphic.

The data field 208G stores data indicating the size of the product graphic. For instance, in the case of a static image, the data field 208G may store data identifying the dimensions of the image. A data field 208H may also be provided that stores data indicating whether the corresponding graphic is the default graphic for the corresponding product. The default graphic is the primary graphic for a product and is typically displayed larger than or prior to the other product graphics on the product page 124.

A data field 208I may also be specified that includes data identifying a pixel map and potentially one or more callouts for the corresponding product graphic. A pixel map defines locations within a product graphic. Callouts are textual identifiers that may be displayed on or adjacent to a product graphic that provides additional detail regarding the product shown in the product graphic. The pixel map may be utilized to specify the locations of the callouts or other information that is displayed in conjunction with a product image. A data field 208J may also be specified that includes data identifying one or more preferred presentation styles for the product graphic. Presentation styles might include preferred colors, fonts, font sizes, and other types of information regarding how the product graphic and other elements displayed therewith should be displayed.

As shown in FIG. 2, the data fields 208K-208P provide similar data as that described above for a second product graphic. Additional data fields may also be included for other product graphics. In this regard, it should be appreciated that while the product graphic description section 204 shown in FIG. 2 includes data for two product graphics, virtually any number of product graphics may be described therein.

As also shown in FIG. 2, the product display section 206 includes at least one data field 208Q that includes display instructions for use by the merchant computing system 104. The display instructions may be configured to provide more complex control over the manner in which the product graphics 112A-112C are displayed. For instance, in one specific example, a manufacturer may provide a static image, a video file, and an application that provides an interactive demonstration of a product. The display instructions 208Q may indicate that the static image should be displayed first, along with a thumbnail of the video and a hyperlink to the application. The display instructions 208Q might also indicate that one of the image, video, or application should be displayed depending upon the network bandwidth available to the customer computing system 106 requesting the product page 124 for the corresponding product. Other types of scenarios might also be defined within the product graphic display section 206.

It should be appreciated that the data fields 208A-208Q illustrated in FIG. 2 are merely illustrative and more or fewer data fields might be specified. For instance, other data fields might be included that define whether a product graphic 112 is an "in-the-box" view of a product (e.g. the retail packaging) or an "out-of-the-box" view of a product (i.e. outside of its retail packaging). Another data field might be provided indicating whether a product graphic is a back view, top view, or side view of a product. Other types of data fields may also be specified.

It should also be appreciated that the data structure schema illustrated in FIG. 2 may be implemented utilizing a markup language such as the Extensible Markup Language ("XML"). Alternately, the product display data 114 shown in FIG. 2 might also be implemented using a binary format or another format known in the art. Additional details regarding the use of the product display data 114 will be provided below with respect to FIGS. 3-5.

Turning now to FIGS. 3 and 4, additional details will be provided regarding the embodiments presented herein for customized product display. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 3 illustrates a routine 300 for describing the operation of the product manufacturer computing system 102. The routine 300 begins at operation 302, where the product graphics 112A-112C are generated for each product and stored in the product database 110A. Once the product graphics 112A-112C have been stored in the product database 110A, product display data 114 is generated for the product graphics 112A-112C. As discussed above with reference to FIG. 2, the product display data 114 describes the product graphics 112A-112C and also provides information regarding how aspects of the product graphics 112A-112C should be displayed on the product page 124 provided by the merchant computing system 104 for the corresponding product.

From operation 304, the routine 300 proceeds to operation 306 where the product manufacturer computing system 102 transmits the product graphics 112A-112C and the product display data 114 to the merchant computing system 104. It should be appreciated that the product graphics 112A-112C and product display data 114 may be transmitted in bulk for a large number of products at one time. It should also be appreciated that the product graphics 112A-112C and the product display data 114 may be periodically updated by the product manufacturer and transmitted to the merchant computing system 104. For instance, a new version of a product or its packaging may be reflected in new product graphics and transmitted to the merchant computing system 104. From operation 306, the routine 300 proceeds to operation 308, where it ends.

FIG. 4 illustrates a routine 400 showing the operation of the merchant computing system 104 according to one embodiment presented herein. The routine 400 begins at operation 402 where the merchant computing system 104 receives the product graphics 112A-112C and the product display data 114 from the product manufacturer computing system 102. The merchant computing system 104 then stores the product graphics 112A-112C and the product display data 114 in the product database 110B.

From operation 402, the routine 400 proceeds to operation 404 where the Web server application 116 receives a request from the Web browser application 118 for a product page 124 corresponding to a product. In response to receiving such a request, the routine 400 proceeds to operation 406 where the Web server application 116 retrieves the product graphics 112A-112C and the product display data 114 for the corresponding product from the product database 110B.

The routine then proceeds to operation 408 where the product display data 114 is utilized to generate the product page 124 for the product. For instance, as discussed above, the product display data 114 may be utilized to generate a product page 124 that includes product graphics selected based on the contents of the customer profile 120, based upon the bandwidth of a connection to the customer computing system 106, or that includes the specified callouts. The product page 124 may also be customized in other ways based upon the product display data 114, the customer profile 120, or other data.

Once the product page 124 has been generated, the Web server application 116 returns the generated page to the Web browser application 118 at operation 410. The Web browser application 118 executing on the customer computing system 106 then renders the product page 124 for display to a user. From operation 410, the routine 400 proceeds to operation 412, where it ends.

It should be appreciated that, according to embodiments, the merchant computing system 104 may utilize other data in conjunction with the product graphics 112A-112C and the product display data 114 to customize the product page 124 provided to a customer computing system 106. As discussed above, for instance, the merchant computing system 104 maintains a customer profile 120 for a customer in one embodiment. The merchant computing system 104 may utilize the contents of the customer profile 120 and the product display data 114 to customize the product page 124 provided to the customer computing system 106.

The customer profile 120 can be utilized in conjunction with the product display data 114 to display the product graphics 112A-112C in a specific manner for the customer. For instance, in one embodiment, a customer profile 120 might indicate that a customer has small children. In this case, the merchant computing system 104 may utilize data stored in the product graphic description section 204 of the product display data 114 to identify product graphics 112A-112C that focus on product safety information. Because a customer with small children may be interested in product safety information, the merchant computing system 104 can cause product graphics 112A-112C focusing on product safety information to be displayed to the customer by default.

In another example, a customer profile 120 indicating that the customer has a particular interest in electronics might cause the merchant computing system 104 to utilize data stored in the product graphic description section 204 of the product display data 114 to identify product graphics 112A-112C containing technical information. These product graphics might then be displayed to the user by default. As another example, a customer profile 120 indicating that a user is interested in the environmental impact of a particular product might cause the merchant computing system 104 to utilize data stored in the product graphic description section 204 of the product display data 114 to identify product graphics 112A-112C that include environmental information about the product. These product graphics may then be displayed to the user. It should be appreciated that other types of customizations made be made by utilizing data contained in a customer profile 120 along with data contained in the product graphic description section 204 of the product display data 114 by the merchant computing system 104.

It should also be appreciated that data other than a customer profile 120 might be utilized to customize the display of the product graphics 112A-112C for a user of the customer computing system 106. For instance, the merchant computing system 104 might determine the category of the e-commerce Web site 122 that the customer is currently viewing. This information might then be utilized in conjunction with the product display data 114 to customize the display of the product graphics 112A-112C.

As another example, the merchant computing system 104 might utilize the product display data 114 along with information describing the available bandwidth to the customer computing system 106 to determine which of the product graphics 112A-112C is displayed to the customer. For instance, a user on a low bandwidth connection might only be provided static images while a user on a higher bandwidth connection might be provided a video or an application program demonstrating aspects of a product.

Figure 5:
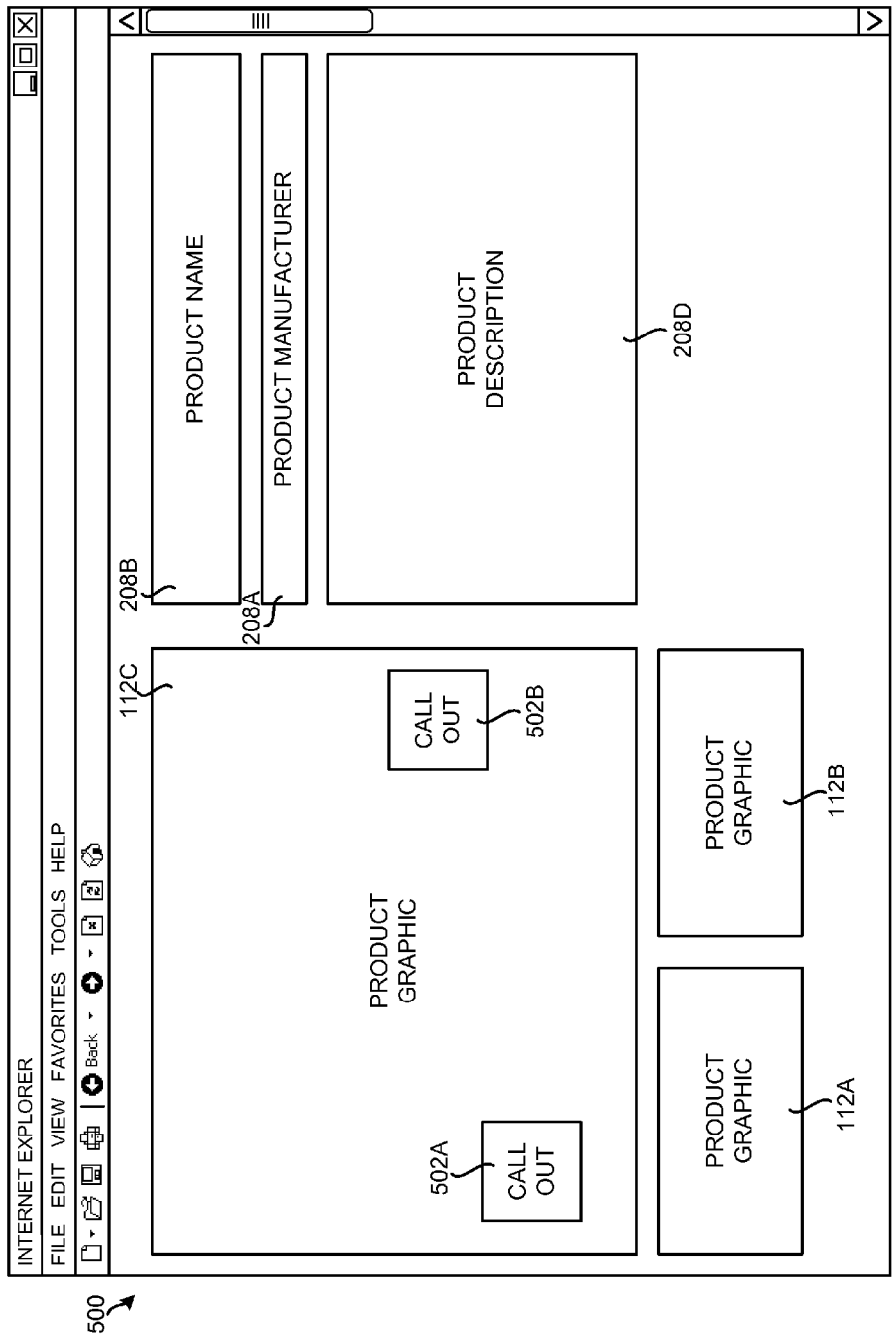
FIG. 5 is a user interface diagram showing one illustrative user interface in which product display data is utilized in the display of one or manufacturer-provided product graphics according to one embodiment presented herein.

Turning now to FIG. 5, a user interface diagram showing one illustrative user interface 500 in which the product display data 114 is utilized in the display of one or more manufacturer provided product graphics 112A-112C will be described. In particular, FIG. 5 shows a screen display provided by the Web browser application 118 following the rendering of a product page 124 for a product provided by the merchant computing system 104.

As illustrated in FIG. 5, the user interface 500 includes a display of the product graphics 112A-112C. In this example, the product graphic 112C has been displayed as the primary graphic and is larger than the product graphics 112A-112B. In this regard, the data contained in the data field 208Q might provide instructions that the product graphics 112A-112C should be displayed in the manner shown in FIG. 5.

The product graphic 112C also includes several callouts 502A-502B. As discussed briefly above, the callouts 502A-502B comprise data that can be overlaid on or adjacent to the product graphics 112A-112C and that provide additional information regarding the product displayed therein. The contents of the data fields 208I and 208O shown in FIG. 2 may be utilized to generate the callouts 502A-502B.

As discussed above, the display instructions contained in the data field 208Q might also indicate that the callouts 502A-502B should be displayed only when a user interface cursor hovers over the product graphic 112C. As utilized herein, the term "hover" refers to placing a user interface cursor over a product graphic or other object without making a selection utilizing a mouse button or other type of user input device.

As shown in FIG. 5, the contents of the field 208B may be utilized to display the name of a product, the contents of the field 208A may be utilized to display the name of the product manufacturer, and the contents of the data field 208D may be utilized to display a description of the product. Other data contained in the product display data 114 might also be utilized to display additional content not shown in FIG. 5 or to customize the display of the product graphics 112A-112C in another manner.

It should be appreciated that while the product display data 114 includes data defining how aspects of the product graphics 112A-112C should be displayed, the merchant computing system 104 may not apply any or all of the instructions contained in the product display data 114. For instance, the product display data 114 may specify a presentation style that is inconsistent with the presentation style of the e-commerce Web site 122 provided by the merchant computing system 104. In this case, the merchant computing system 104 may choose to ignore the contents of the product display data 114 regarding the preferred presentation style.

The merchant computing system 104 may also ignore instructions contained in the product display data 114 where the instructions might: cause an incompatibility with the Web browser application 118, cause an incompatibility with the Web server application 116, cause the merchant computing system 104 to utilize a significant amount of processing resources or bandwidth, or for other reasons. In this regard, the product display data 114 may be considered to provide hints to the merchant computing system 104 as to how the product graphics 112A-112C should be displayed.

It should also be appreciated that, in order to provide the greatest value to e-commerce merchants, the data structure schema utilized to embody the product display data 114 would ideally become an industry standard format. In this manner, manufacturers could provide product graphics 112A-112C and product display data 114 to e-commerce merchants in the industry standard format. Such a format would streamline operations between manufacturers and merchants and may result in significant cost savings to both.

Figure 6:
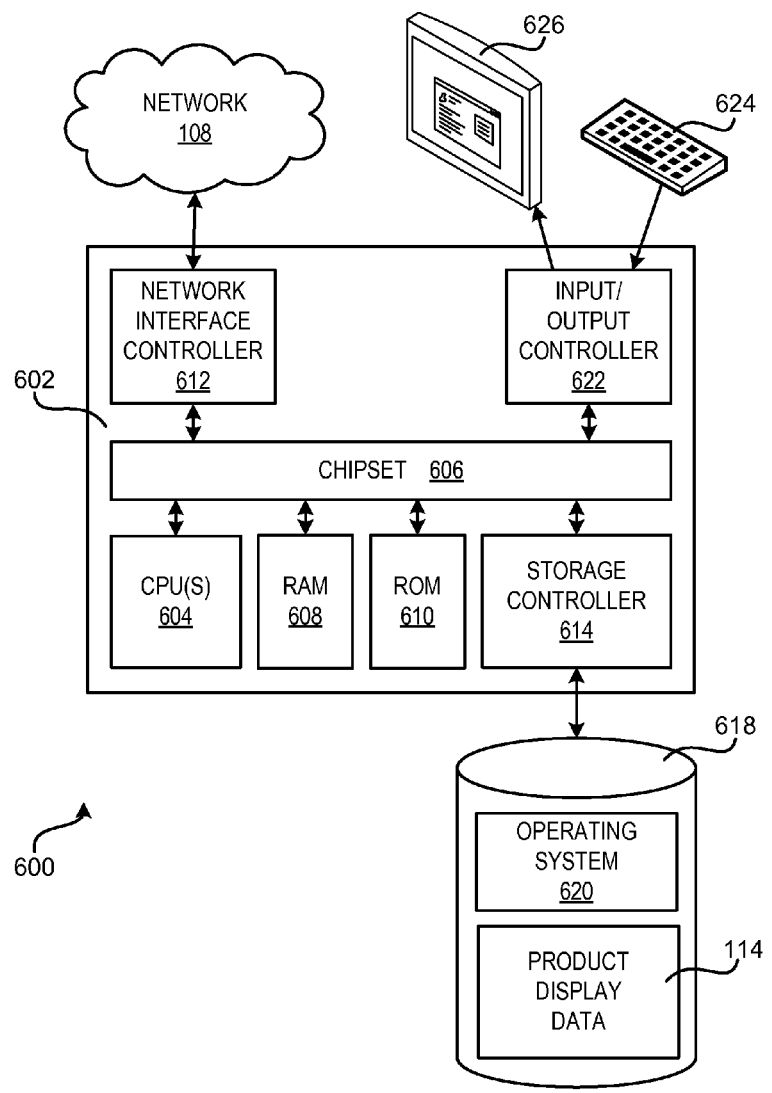
FIG. 6 is a computer architecture diagram showing an illustrative computer hardware architecture for computing devices described in embodiments presented herein.

FIG. 6 shows an example computer architecture 600 for a computer 602 capable of executing the software components described herein for customized product display, in the manner presented above. The computer architecture 600 shown in FIG. 6 illustrates a conventional server computer, workstation, desktop computer, laptop, network appliance, personal digital assistant ("PDA"), digital cellular phone, or other computing device, and may be utilized to execute any aspects of the software components presented herein described as executing on the product manufacturer computing system 102, the merchant computing system 104, the customer computing system 106, or other computing platform.

The computer 602 includes a baseboard, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 are standard programmable processors that perform arithmetic and logical operations necessary for the operation of the computer 602.

The CPUs 604 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders, subtractors, arithmetic logic units, floating-point units, and the like.

The chipset 606 provides an interface between the CPUs 604 and the remainder of the components and devices on the baseboard. The chipset 606 may provide an interface to a random access memory ("RAM") 608, used as the main memory in the computer 602. The chipset 606 may further provide an interface to a computer-readable storage medium such as a read-only memory ("ROM") 610 or non-volatile RAM ("NVRAM") for storing basic routines that help to startup the computer 602 and to transfer information between the various components and devices. The ROM 610 or NVRAM may also store other software components necessary for the operation of the computer 602 in accordance with the embodiments described herein.

According to various embodiments, the computer 602 may operate in a networked environment using logical connections to remote computing devices and computer systems through the network 108. The chipset 606 includes functionality for providing network connectivity through a network interface controller ("NIC") 612, such as a gigabit Ethernet adapter. The NIC 612 is capable of connecting the computer 602 to other computing devices over the network 108, such as the product manufacturer computing system 102, the merchant computing system 104, the customer computing system 106, and the like. It should be appreciated that any number of NICs 612 may be present in the computer 602, connecting the computer to other types of networks and remote computer systems.

The computer 602 may be connected to a mass storage device 618 that provides non-volatile storage for the computer. The mass storage device 618 may store system programs, application programs, other program modules, and data, which are described in greater detail herein. The mass storage device 618 may be connected to the computer 602 through a storage controller 614 connected to the chipset 606. The mass storage device 618 may consist of one or more physical storage units. The storage controller 614 may interface with the physical storage units through a serial attached SCSI ("SAS") interface, a serial advanced technology attachment ("SATA") interface, a fiber channel ("FC") interface, or other standard interface for physically connecting and transferring data between computers and physical storage units.

The computer 602 may store data on the mass storage device 618 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 618 is characterized as primary or secondary storage, and the like. For example, the computer 602 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 may further read information from the mass storage device 618 by detecting the physical states or characteristics of one or more particular locations within the physical storage units.

In addition to the mass storage device 618 described above, the computer 602 may have access to other computer-readable storage medium to store and retrieve information, such as program modules, data structures, or other data. It should be appreciated by those skilled in the art that computer-readable storage media can be any available media that may be accessed by the computer 602. By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 618 may store an operating system 620 utilized to control the operation of the computer 602. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized.

The mass storage device 618 may store other system or application programs and data utilized by the computer 602, such as the product display data 114 described above in regard to FIGS. 1-2. In one embodiment, the mass storage device 618 or other computer-readable storage media may be encoded with computer-executable instructions that, when loaded into the computer 602, may transform the computer from a general-purpose computing system into a special-purpose computer capable of implementing the embodiments described herein. These computer-executable instructions transform the computer 602 by specifying how the CPUs 604 transition between states, as described above. According to one embodiment, the computer 602 may have access to computer-readable storage media storing computer-executable instructions that, when executed by the computer, perform the routines 300 and 400, as described above in regard to FIGS. 3-4.

The computer 602 may also include an input/output controller 622 for receiving and processing input from a number of input devices 624, such as a keyboard, a mouse, a touchpad, a touch screen, an electronic stylus, or other type of input device. Similarly, the input/output controller 622 may provide output to a display device 626, such as a computer monitor, a flat-panel display, a digital projector, a printer, a plotter, or other type of output device. It will be appreciated that the computer 602 may not include all of the components shown in FIG. 6, may include other components that are not explicitly shown in FIG. 6, or may utilize an architecture completely different than that shown in FIG. 6.

Based on the foregoing, it should be appreciated that technologies for customized product display are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for customized product display, the method comprising performing instructions under the control of a computer system for:
    storing a plurality of product graphics for a product and product display data corresponding to the product graphics, wherein the product display data comprises data defining one or more callouts for a particular product graphic and a pixel map, the one or more callouts configured to be overlaid on the particular product graphic when a user interface cursor hovers over the particular product graphic on the product page, and the pixel map specifying a location of the one or more callouts on the particular product graphic;
    retrieving the plurality of product graphics for the product and the product display data for the product;
    receiving a request for a product page from a customer;
    identifying the particular product graphic from the plurality of product graphics based on the product display data and a customer profile associated with the customer to be displayed through a network website;
    utilizing the identified particular product graphic to generate a product page that is customized for the customer; and
    providing the generated product page through the network website in response to the request for the product page.

2. The computer-implemented method of claim 1, wherein a manufacturer of the product provides the plurality of product graphics for the product and the corresponding product display data to a computing system configured to provide the network website.

3. The computer-implemented method of claim 1, wherein the product display data comprises data specifying whether a product graphic comprises an "in-the-box" view or an "out-of-the-box" view of the product.

4. The computer-implemented method of claim 1, wherein utilizing the identified particular product graphic and the corresponding preferred presentation style to generate the product page comprises utilizing the product display data to generate a product page that includes the identified particular product graphic and the one or more callouts at locations on the identified particular product graphic specified by the pixel map.

5. The computer-implemented method of claim 1, wherein the product display data comprises data specifying that one or more of the plurality of product graphics be displayed in the product page depending upon a network bandwidth available to a customer computing system in communication with a computing system configured to provide the network website.

6. The computer-implemented method of claim 5, wherein utilizing the identified particular product graphic to generate the product page comprises determining the network bandwidth available to the customer computing system, selecting one or more of the plurality of product graphics for display on the product page based at least in part on the determined network bandwidth, generating the product page with the selected product graphics, and providing the generated product page through the network website.

7. A non-transitory computer-readable storage medium having computer-executable instructions stored thereon which, when executed by a computer, cause the computer to:
receive one or more product graphics and product display data for a product, the product display data defines one or more callouts for the particular product graphic and a pixel map, the one or more callouts configured to be overlaid on a particular product graphic when a user interface cursor hovers over the particular product graphic on the product page, and the pixel map specifying a location of the one or more callouts on the particular product graphic;
store the product graphics and the product display data in a product database;
identify the particular product graphic from the one or more product graphics for display to a customer through a network website based on the product display data and a customer profile associated with the customer; and
utilize the identified particular product graphic to generate a product page for the product for display through the network website.

8. The non-transitory computer-readable storage medium of claim 7, wherein the product display data defines how aspects of the particular product graphic should be displayed through the network website.

9. The non-transitory computer-readable storage medium of claim 7, wherein the product display data specifies whether a product graphic comprises an "in-the-box" view or an "out-of-the-box" view of the product.

10. The non-transitory computer-readable storage medium of claim 7, wherein the product display data comprises a product description section, a product graphic description section, and a product graphic display section.

11. The non-transitory computer-readable storage medium of claim 10, wherein the product description section comprises a product name, a product identifier, and a product description.

12. The non-transitory computer-readable storage medium of claim 10, wherein the product graphic description section comprises data specifying whether each product graphic is a default product graphic.

13. The non-transitory computer-readable storage medium of claim 10, wherein the product graphic display section comprises data specifying that the product graphics should be displayed based upon a network bandwidth available to a customer computing system in communication with a computing system configured to provide the network website.

14. A system for customized product display, the system comprising:
a server computer comprising a memory and a central processing unit;
a product database operably connected to the server computer and storing one or more product graphics and product display data, the product display data defines one or more callouts for one or more of the product graphics and a pixel map, each of the one or more callouts configured to be overlaid on the product graphic at a location specified by the pixel map when a user interface cursor hovers over the product graphic on the product page; and
one or more program modules residing in the memory and configured to execute on the central processing unit that, when executed,
retrieve the one or more product graphics and the product display data for the product from the product database,
retrieve data from a customer profile associated with a customer,
identify a particular product graphic from the one or more product graphics for display to the customer through a network website based on the product display data and the data retrieved from the customer profile,
generate a product page utilizing the identified particular product graphic,
receive a request from the customer for a product page for a product, and
provide the generated product page through the network website in response to the request for the product page.

15. The system of claim 14, wherein generating a product page utilizing the product graphic and the product display data comprises determining a network bandwidth available to a customer computing system in communication with a remote computing system configured to provide the network website, selecting one or more of the product graphics for display on the product page based at least in part on the determined network bandwidth, generating the product page with the selected product graphics, and providing the generated product page through the network website.

16. The system of claim 14, wherein the product display data comprises a product description section, a product graphic description section, and a product graphic display section.

17. The system of claim 16, wherein the product graphic description section specifies a name, type, and size for each of the product graphics, and whether each product graphic is a default product graphic 18. The system of claim 16, wherein the product graphic description section specifies whether a product graphic comprises an "in-the-box" view or an "out-of-the-box" view of the product.

* * * * *